US012785264B2

(12) United States Patent
Jung et al.

(10) Patent No.: US 12,785,264 B2
(45) Date of Patent: Nov. 3, 2026

(54) SHIELD CAN HAVING ANTENNA FUNCTION

(71) Applicant: AMOTECH CO., LTD., Incheon (KR)

(72) Inventors: Hongdae Jung, Incheon (KR); Jiwoong Jeong, Incheon (KR); Kyunghyun Ryu, Incheon (KR); Yunsik Seo, Incheon (KR); Hyungil Baek, Incheon (KR); Jungryul Kim, Incheon (KR); Jaemin Kim, Incheon (KR)

(73) Assignee: AMOTECH CO., LTD., Incheon (KR)

( * ) Notice: Subject to any disclaimer, the term of this patent is extended or adjusted under 35 U.S.C. 154(b) by 121 days.

(21) Appl. No.: 18/686,865

(22) PCT Filed: Aug. 25, 2022

(86) PCT No.: PCT/KR2022/012697
§ 371 (c)(1),
(2) Date: Feb. 26, 2024

(87) PCT Pub. No.: WO2023/027519
PCT Pub. Date: Mar. 2, 2023

(65) Prior Publication Data

US 2024/0372250 A1 Nov. 7, 2024

(30) Foreign Application Priority Data

Aug. 27, 2021 (KR) ........................ 10-2021-0113580

(51) Int. Cl.
*H01Q 21/28* (2006.01)
*H01Q 1/38* (2006.01)
*H01Q 1/52* (2006.01)

(52) U.S. Cl.
CPC ............... *H01Q 1/526* (2013.01); *H01Q 1/38* (2013.01); *H01Q 21/28* (2013.01)

(58) Field of Classification Search
CPC .......... H01Q 1/526; H01Q 1/38; H01Q 21/28; H01Q 1/52; H01Q 9/0457; H01Q 13/10; H05K 9/0026
See application file for complete search history.

(56) References Cited

U.S. PATENT DOCUMENTS 6,181,281 B1 * 1/2001 Desclos ............... H01Q 9/0407 343/700 MS
6,392,603 B1 * 5/2002 Kurz ...................... H01Q 1/526 343/702

(Continued)

FOREIGN PATENT DOCUMENTS

JP 2007-259412 A 10/2007
KR 10-2011-0019083 A 2/2011

(Continued)

OTHER PUBLICATIONS

KR Office Action dated Nov. 21, 2023 as received in Application No. 10-2021-0113580.

*Primary Examiner* — Alexander H Taningco
*Assistant Examiner* — Anna N Hamadyk
(74) *Attorney, Agent, or Firm* — Maschoff Brennan

(57) ABSTRACT

Proposed is a shield can in which slots are formed to define radiation regions resonating in at least one frequency band so as to enable the shield can to operate as an antenna while shielding electromagnetic waves. The proposed shield can comprises: a plurality of slits formed in the shield can to separate the shield can into a plurality of internal regions and an external region spaced apart from the plurality of internal regions; a shielding region that is the external region separated by the plurality of slits; and radiation regions that are the plurality of internal regions separated by the plurality of slits.

9 Claims, 5 Drawing Sheets

(56) References Cited

U.S. PATENT DOCUMENTS

| | | | | |
|---|---|---|---|---|
| 7,298,339 | B1 * | 11/2007 | Ollikainen | H01Q 1/243 343/702 |
| 8,085,203 | B1 * | 12/2011 | Klein | H01Q 21/065 343/846 |
| 2006/0077113 | A1 * | 4/2006 | Yuanzhu | H01Q 13/10 343/770 |
| 2013/0187818 | A1 * | 7/2013 | Desclos | H01Q 1/526 343/770 |
| 2021/0091455 | A1 * | 3/2021 | Liu | H01Q 13/10 |
| 2021/0356550 | A1 * | 11/2021 | Lee | H01Q 1/526 |

FOREIGN PATENT DOCUMENTS

| | | | |
|---|---|---|---|
| KR | 10-1077452 | B1 | 10/2011 |
| KR | 10-2019-0072024 | A | 6/2019 |
| KR | 10-2022-0143313 | A | 10/2022 |

* cited by examiner

[FIG. 1]
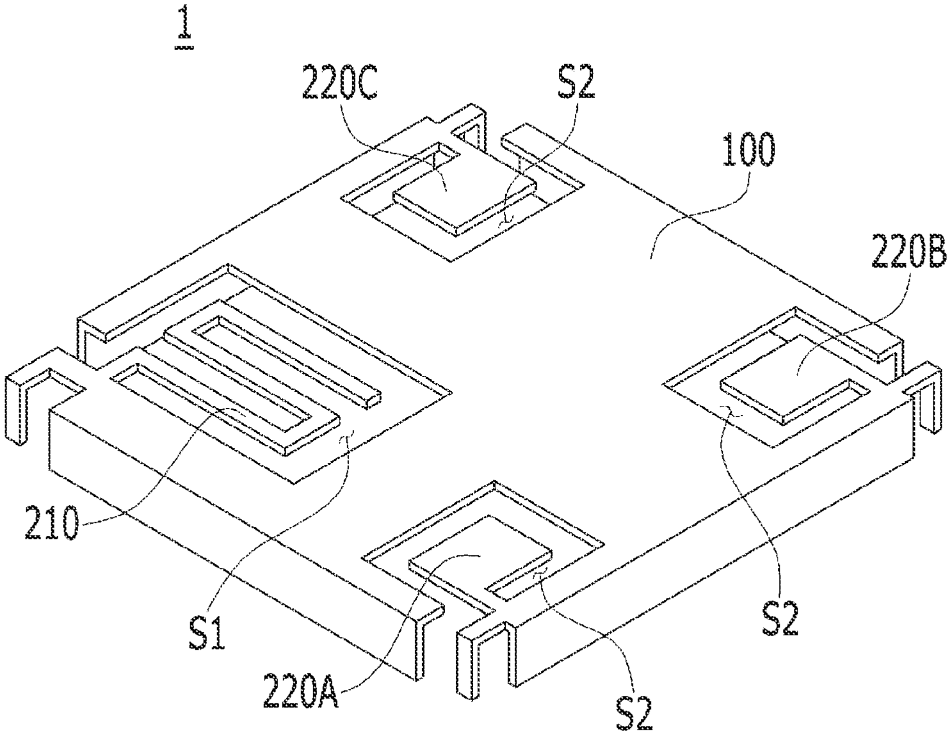

[FIG. 2]
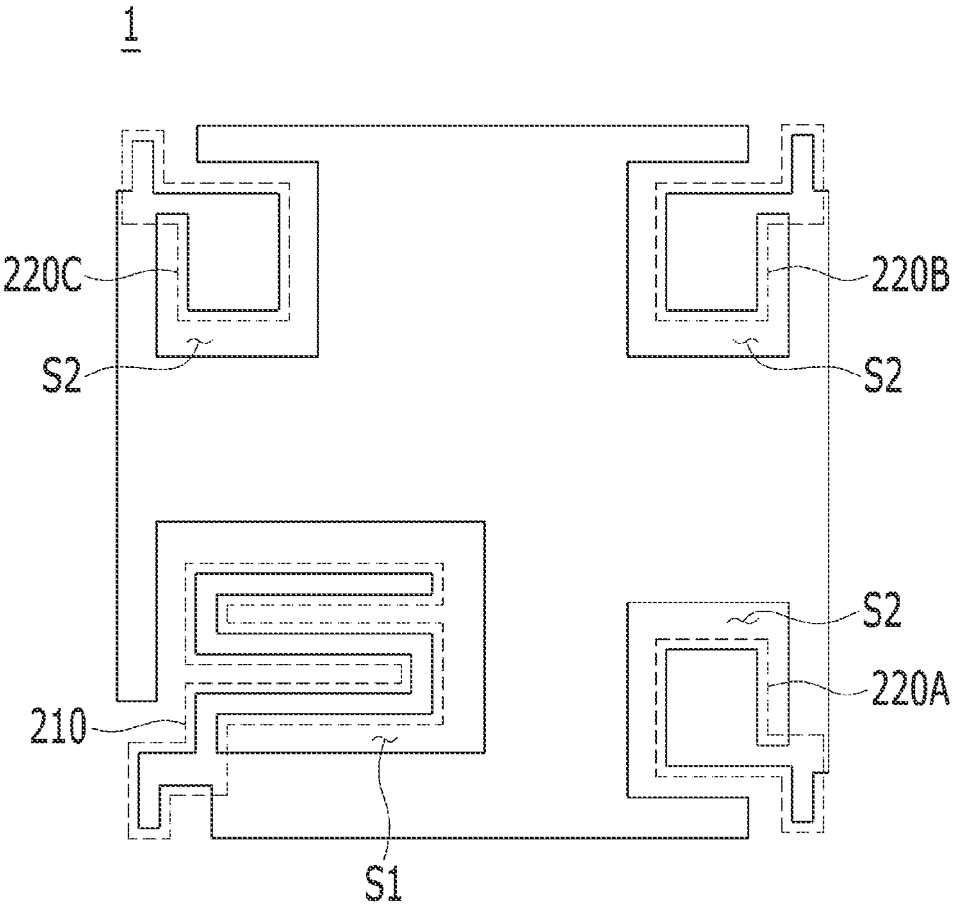

[FIG. 3]
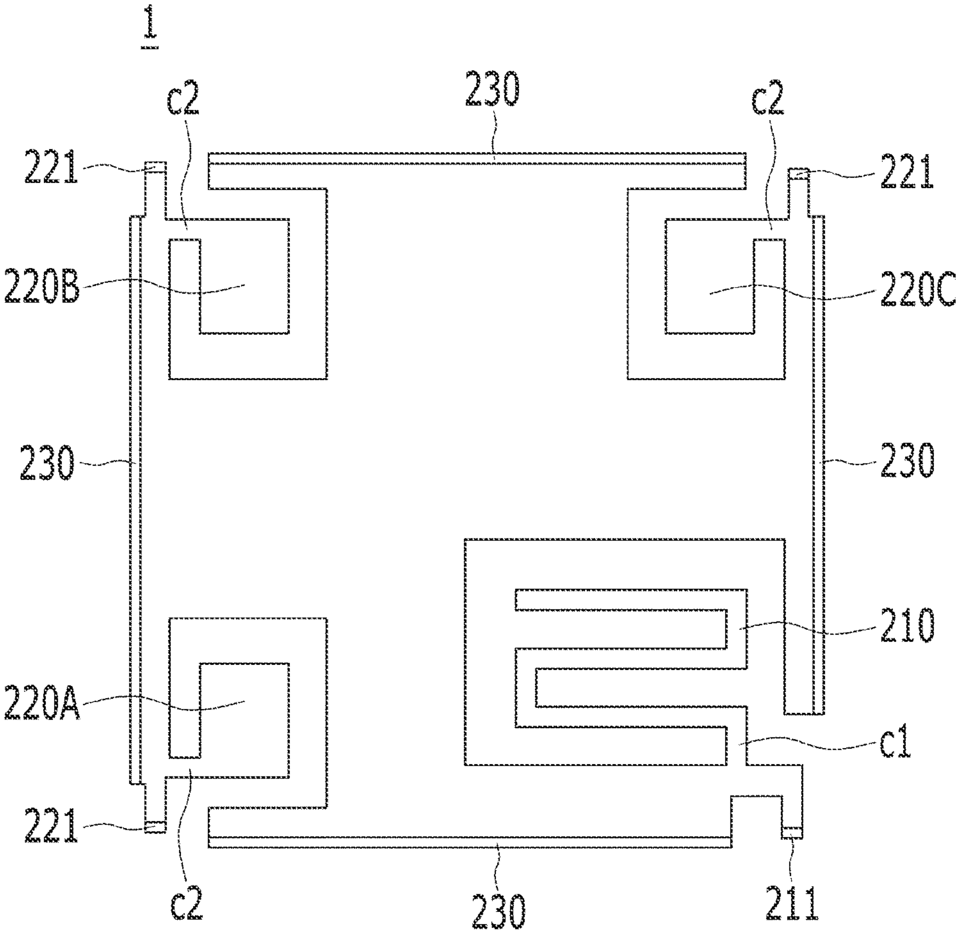

[FIG. 4]
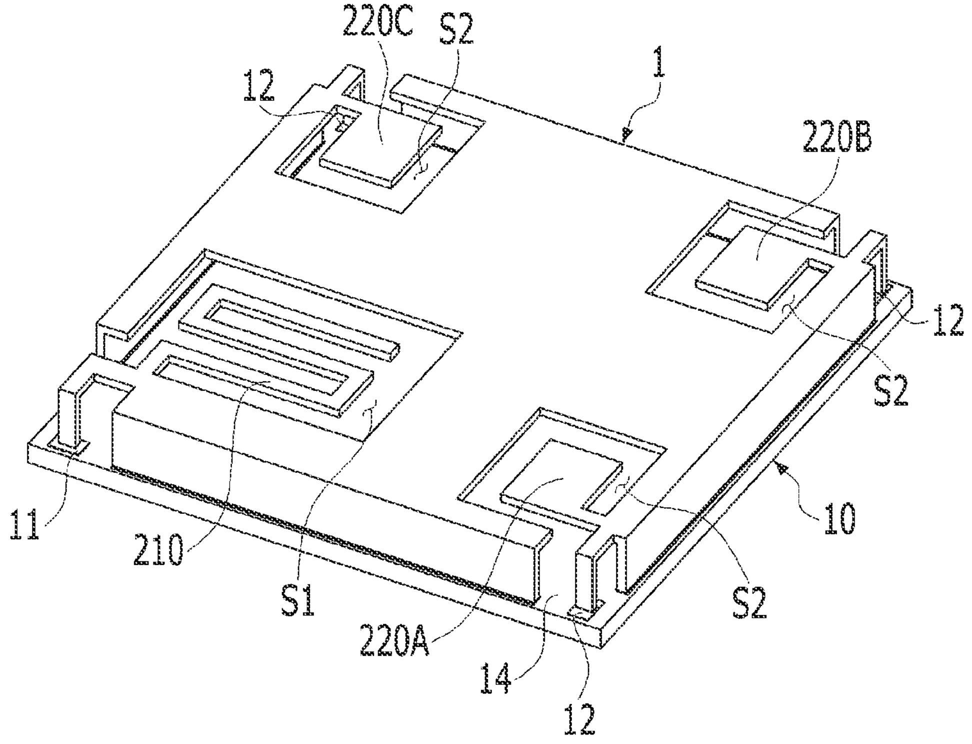

[FIG. 5]
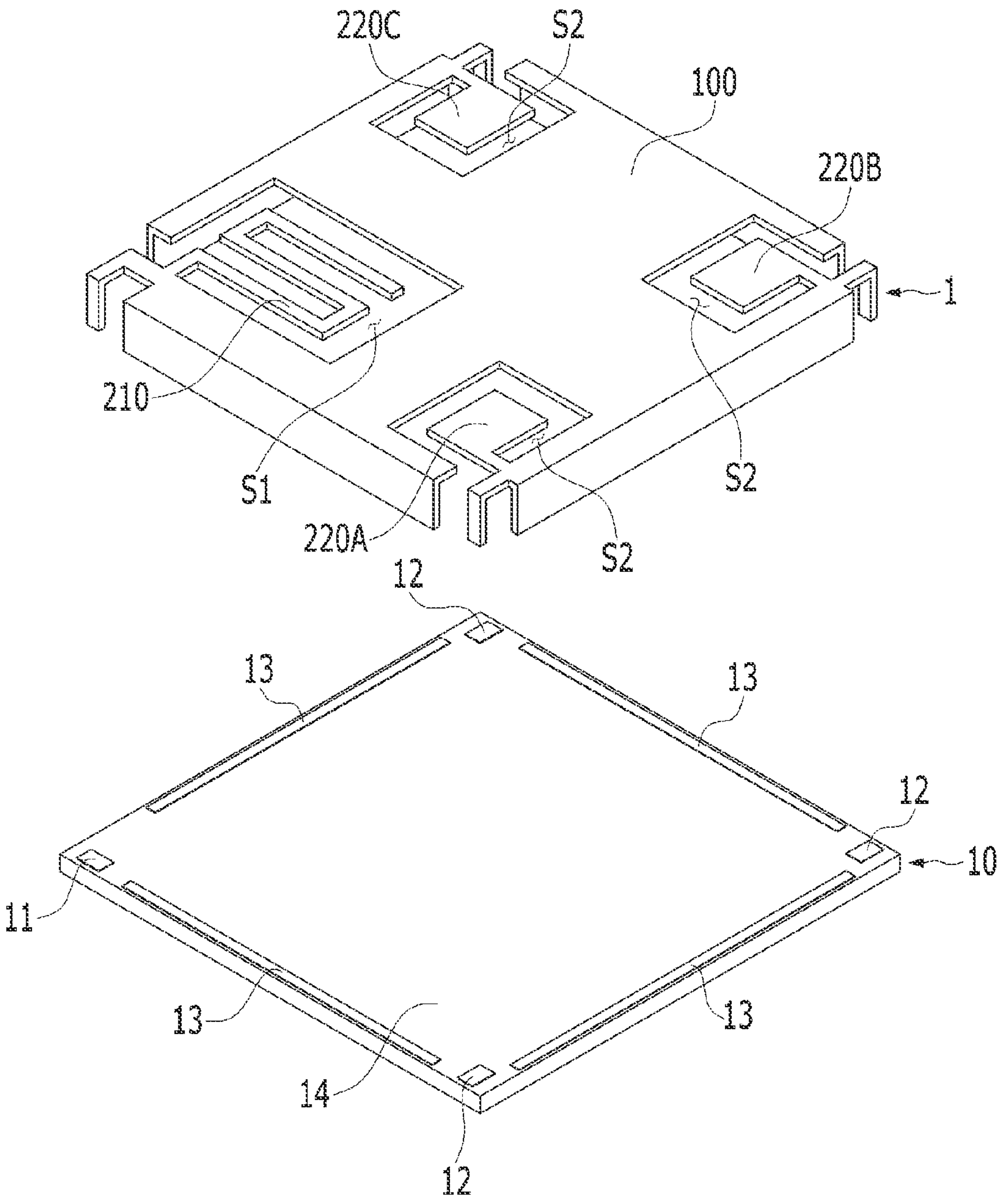

SHIELD CAN HAVING ANTENNA FUNCTION

TECHNICAL FIELD

The present disclosure relates to a shield can mounted on an electronic device to shield electromagnetic waves to block noises.

BACKGROUND ART

Recently, as electronic devices have become more complex and have advanced specifications, the number of antennas mounted (or installed) is increasing. For example, recent smartphones are equipped with an antenna for transmitting and receiving signals in mobile communication frequency bands, an antenna for short-range communication such as Bluetooth® and near-field communication (NFC), a global positioning system (GPS) antenna and an ultra-wideband (UWB) antenna for transmitting and receiving position information, and the like.

However, as an electronic device is gradually becoming slimmer and smaller, there is a problem in that a space for mounting electronic components and antennas is insufficient, and due to a reduction of the mounting space, interference occurs between the electronic components and the antennas mounted on the electronic device, thereby degrading the performance of the antennas.

Therefore, a shield can for shielding electromagnetic waves is mounted on the electronic device, and there is a problem in that as the shield can is additionally disposed, the mounting space becomes more insufficient, and a layout structure and circuits of the electronic components become complicated.

SUMMARY OF INVENTION

Technical Problem

The present disclosure has been proposed to solve the problems and is directed to providing a shield can, which operates as an antenna for location determination while shielding electromagnetic waves by defining a radiation area resonating in one or more frequency bands according to the formation of slits.

Solution to Problem

To achieve the object, a shield can disposed on a printed circuit board to cover electronic components mounted on the printed circuit board according to an embodiment of the present disclosure may include a plurality of slits formed in the shield can to partition the shield can into a plurality of internal areas and an external area spaced apart from the plurality of internal areas, a shielding area which is the external area partitioned by the plurality of slits, and radiation areas which are the plurality of internal areas partitioned by the plurality of slits.

The radiation areas may be disposed in a perimetric direction of the shield can at distances.

Each of the radiation areas may be disposed adjacent to four corners of the shield can.

Each of the plurality of slits may be formed by opening a portion of an upper surface and a portion of a side surface of the shield can.

Each of the plurality of slits may be in the form of surrounding each of the radiation areas in all directions and in the form of an open portion except for a connection portion of the radiation area and the shield area.

The radiation area may have one of a meander line shape or a patch shape.

A first radiation area, which is any one of the radiation areas, may be formed in a meander line shape to resonate in a first frequency band, and a plurality of second radiation areas except for the first radiation area among the radiation areas may be formed in a patch shape to resonate in a second frequency band which differs from the first frequency band.

The plurality of slits may include a first slit disposed between the first radiation area and the shielding area, and a second slit disposed between the plurality of second radiation areas and the shielding area, and widths of the first slit and the second slit may be 1 mm or more.

Two adjacent radiation areas among the plurality of second radiation areas may be provided symmetrically on an upper surface of the shield can.

The first radiation area may resonate in the first frequency band to operate as a Bluetooth® low energy (BLE) antenna, and the plurality of second radiation areas may resonate in the second frequency band to operate as an ultra-wideband (UWB) antenna.

The shield can may further include a feeding area formed on a lower surface of the shield can and connected to each of the radiation areas, and a bonding area formed along a bottom edge of the shield can, spaced apart from the feeding area, and bonded to the printed circuit board.

Advantageous Effects of Invention

According to the present disclosure, the shield can may operate as the antenna by forming the slits (or the slots) and forming the metal radiation area.

In addition, since the plurality of radiation areas disposed to be spaced apart from each other operate as the antenna for location determination, the shield can perform the location determination with high accuracy and optimize the performance of the location determination.

In addition, since the shield can operates as the antenna and thus there is no need to install the separate antenna on the electronic device, it is possible to secure the mounting space as compared to the conventional electronic device on which the antenna and the shield can are mounted.

In addition, since the shield can does not require the additional antenna, it is possible to save the unit price of the electronic device and manufacture the small-sized electronic device, thereby making the electronic device slim and compact as compared to the conventional electronic device on which the antenna and the shield can are mounted.

BRIEF DESCRIPTION OF DRAWINGS

FIG. 1 is a perspective view for describing a shield can according to an embodiment of the present disclosure.

FIG. 2 is a plan view for describing the shield can according to the embodiment of the present disclosure.

FIG. 3 is a bottom view for describing the shield can according to the embodiment of the present disclosure.

FIG. 4 is a perspective view for describing a bonding structure of the shield can and a circuit board according to the embodiment of the present disclosure.

FIG. 5 is an exploded perspective view of FIG. 4.

DESCRIPTION OF EMBODIMENTS

Hereinafter, the most preferred embodiment of the present disclosure will be described with reference to the accompanying drawings in order to describe the present disclosure in detail to the extent that those skilled in the art can easily carry out the technical spirit of the present disclosure. First, in adding reference numerals to components in each drawing, it should be noted that the same components have the same reference numerals as much as possible even when they are shown in different drawings. In addition, in describing embodiments of the present disclosure, when it is determined that the detailed description of related known configurations or functions may obscure the gist of the present disclosure, a detailed description thereof will be omitted.

Referring to FIG. 1, a shield can 1 according to an embodiment of the present disclosure is configured in the form of covering electronic components (not illustrated) mounted on a circuit board 10 (see FIG. 5) from an upper portion of the circuit board 10. The shield can 1 is made of plate-shaped metal to shield electromagnetic waves. For example, the shield can 1 is formed in a rectangular parallelepiped shape having an open lower surface to accommodate the electronic components.

A plurality of slits (i.e., a first slit S1 and a second slit S2 or slots) for forming a portion of the shield can 1 as a radiation area are formed in the shield can 1. Radiation areas 210, 220A, 220B, and 220C in various shapes may be formed in the shield can 1 by the plurality of slits S1 and S2, and the radiation area in a meander line shape, a patch shape (plate shape), or the like may be formed depending on frequency bands in which the radiation areas 210, 220A, 220B, and 220C resonate.

In this case, although FIG. 1 illustrates that the four radiation areas 210, 220A, 220B, and 220C are formed on the shield can 1 to easily describe the embodiment of the present disclosure, the present disclosure is not limited thereto, and the number of radiation areas may be changed variously.

Referring to FIGS. 1 and 2, the plurality of slits S1 and S2 may be formed in the shield can 1. The plurality of slits S1 and S2 are formed by opening a portion of an upper surface and a portion of a side surface of the shield can 1 and may partition the shield can 1 into a plurality of inner areas and an outer area spaced apart from the plurality of inner areas.

Here, the external area partitioned by the plurality of slits S1 and S2 may be a shielding area 100, and the plurality of internal areas partitioned by the plurality of slits S1 and S2 may be the radiation areas 210, 220A, 220B, and 220C. In other words, the shielding area 100 may be defined as an area disposed outside the plurality of slits S1 and S2 to shield electromagnetic waves, and the radiation areas 210, 220A, 220B, and 220C may be defined as the areas disposed inside each of the plurality of slits S1 and S2.

The first radiation area 210, which is any one of the radiation areas 210, 220A, 220B, and 220C, is an area of the upper surface of the shield can 1, which operates as a radiator which resonates with a signal in a first frequency band. The first radiation area 210 is an area disposed in an inner circumference of the first slit S1 provided to form the radiation area.

The first radiation area 210 is formed in a meander line shape with a predetermined line width. In this case, for example, the first radiation area 210 operates as a Bluetooth® low energy (BLE) antenna which is formed in a meander line shape with one or more bent portions to resonate with the signal in the first frequency band and is formed in a meander line shape with seven bent portions to resonate with a signal in a BLE frequency band. Here, since a line width, area, and the like of the first radiation area 210 may be variously changed depending on the electronic components to be accommodated, the resonant frequency band, or the like, the values are not limited.

Meanwhile, when the first radiation area 210 and the shielding area 100 are disposed adjacent to each other, signal interference occurs and the antenna performance of the first radiation area 210 is inevitably degraded. Therefore, the first radiation area 210 is disposed to be spaced by a set distance or more from the shielding area 100. In other words, the first slit S1 positioned between the first radiation area 210 and the shielding area 100 is disposed to have a width that is larger than or equal to a set width. Here, the width of the first slit S1 is, for example, about 1 mm or more.

The second radiation patterns 220A, 220B, and 220C, which are the remaining radiation areas except for the first radiation area 210 among the radiation areas 210, 220A, 220B, and 220C are areas of the upper surface of the shield can 1, which operate as a radiator which resonates with a signal in a second frequency band. The second radiation areas 220A, 220B, and 220C are areas disposed in an inner circumference of the second slit S2 provided to form the radiation area.

The second radiation areas 220A, 220B, and 220C are formed in a patch shape (plate shape) with a predetermined area. In this case, for example, the second radiation areas 220A, 220B, and 220C operate as an ultra-wideband (UWB) antenna which is formed in a quadrangular patch shape with a predetermined area to resonate with the signal in the second frequency band, which differs from the first frequency band, that is, a UWB frequency band. Here, since areas, shapes, and the like of the second radiation areas 220A, 220B, and 220C may be variously changed depending on the electronic components to be accommodated, the resonant frequency band, or the like, the values are not limited.

Meanwhile, when the second radiation areas 220A, 220B, and 220C and the shielding area 100 are disposed adjacent to each other, signal interference occurs and thus the antenna performance of the second radiation areas 220A, 220B, and 220C are inevitably degraded. Therefore, the second radiation areas 220A, 220B, and 220C are disposed to be spaced by a set distance or more from the shielding area 100. In other words, the second slit S2 positioned between each of the second radiation areas 220A, 220B, and 220C and the shielding area 100 is disposed to have a width that is larger than or equal to a set width. Here, the width of the second slit S2 is, for example, about 1 mm or more.

The first radiation area 210 and the plurality of second radiation areas 220A, 220B, and 220C may be disposed at distances in a perimetric direction of the shield can 1. As described above, the present disclosure is characterized that the plurality of radiation areas 210, 220A, 220B, and 220C may operate as a plurality of antennas for location determination.

Examples of the location determination method include time difference of arrival (TDoA) by a radio wave arrival time and trigonometric equation, time of arrival (TOA) calculating the radio wave arrival time, angle of arrival (AOA) using an angle of a transmitted signal, a method using the RSSI, a Wi-Fi positioning technique using a wireless AP, or the like. Among them, in the present disclosure, the AOA location determination method may be used to increase location determination accuracy, and to this end, the plurality of radiation areas 210, 220A, 220B, and 220C may be provided.

When the plurality of radiation areas 210, 220A, 220B, and 220C operate as antennas for location determination, the location determination with high accuracy is possible by using an angle, strength, or the like of a signal transmitted to each antenna.

Each of the plurality of radiation areas 210, 220A, 220B, and 220C may be aligned and disposed adjacent to four corners of the shield can 1 and thus disposed at predetermined distances. As described above, since the plurality of radiation areas 210, 220A, 220B, and 220C are spaced by a distance, which may have a significant difference in the signal angle, signal strength, or the like, from each other, it is possible to perform more accurate location determination based on the location determination result using each of the plurality of radiation areas 210, 220A, 220B, and 220C and optimize the performance of the location determination.

Referring to FIG. 3, each of the plurality of slits S1 and S2 is in the form of surrounding each of the radiation areas 210, 220A, 220B, and 220C in all directions and may be in the form of an open portion except for connection portions c1 and c2 of the radiation areas 210, 220A, 220B, and 220C and the shielding area 100. In other words, the first radiation area 210 may be spaced apart from the shielding area 100 with the first slit S1 interposed therebetween and connected to the shielding area 100 by the connection portion c1. In addition, the second radiation areas 220A, 220B, and 220C may be spaced apart from the shielding area 100 with the second slit S2 interposed therebetween and connected to the shielding area 100 by the connection portion c2.

Meanwhile, two adjacent second radiation areas among the plurality of second radiation areas 220A, 220B, and 220C may be disposed symmetrically on the upper surface of the shield can 1. In other words, the adjacent second radiation areas 220A and 220B may be disposed symmetrically on the upper surface of the shield can 1. In addition, the adjacent second radiation areas 220B and 220C may be disposed symmetrically on the upper surface of the shield can 1.

Meanwhile, a bonding area 230, a first feeding area 211, and a second feeding area 221 are defined on a lower surface of the shield can 1.

The bonding area 230 is an area which is bonded to an attachment area 13 disposed on the circuit board 10 when the shield can 1 is mounted on the circuit board 10. The bonding area 230 is formed along a bottom edge of the shield can 1 and has a predetermined area.

The first feeding area 211 is an area connected to a first feeding pad 11 of the circuit board 10 to supply power to the first radiation area 210. An end portion of the first radiation area 210 may extend to a lower portion of the shield can 1 through the side surface of the shield can 1, and in this case, the first feeding area 211 may be a lower surface of the first radiation area 210. The first feeding area 211 is connected to a first signal processing element (not illustrated) for processing the signal in the first frequency band through the first feeding pad 11 of the circuit board 10. In this case, for example, the first feeding area 211 is spaced by a set distance or more from the bonding area 230, and the set distance is about 1 mm or more.

The second feeding area 221 is an area connected to a second feeding pad 12 of the circuit board 10 to supply power to the second radiation area 220. An end portion of the second radiation area 220 may extend to the lower portion of the shield can 1 through the side surface of the shield can 1, and in this case, the second feeding area 221 may be a lower surface of the second radiation area 220. The second feeding area 221 is connected to a second signal processing element (not illustrated) for processing the signal in the second frequency band through the second feeding pad 12 of the circuit board 10. In this case, for example, the second feeding area 221 is spaced by a set distance or more from the bonding area 230, and the set distance is about 1 mm or more.

Meanwhile, in FIGS. 1 to 3, it has been illustrated and described that the first radiation area 210 and the second radiation area 220 are defined in the shield can 1, but the present disclosure is not limited thereto, and only one radiation area among the first radiation area 210 and the second radiation areas 220 may be defined. For example, the shield can 1 may be formed of four second radiation areas 220.

Referring to FIGS. 4 and 5, the shield can 1 according to the embodiment of the present disclosure is mounted on the circuit board 10 disposed inside the electronic device.

The circuit board 10 is disposed inside the electronic device, and electronic components are mounted on the upper surface 14 on which the shield can 1 is mounted. In this case, the attachment area 13 in surface contact with the bonding area 230 of the shield can 1 and fixedly bonding the shield can 1 is formed on the upper surface of the circuit board 10.

The attachment area 13 is formed on the upper surface of the circuit board 10 through a surface mount device (SMD) process. In this case, the attachment area 13 may be formed along an outer perimeter of the upper surface of the circuit board 10 and may have a shape corresponding to the shape of the bonding area 230 formed on the lower surface of the shield can 1.

The upper surface 14 of the circuit board 10 may be provided with the first feeding pad 11 and the second feeding pad 12 for supplying power to the first radiation area 210 and the second radiation area 220 of the shield can 1.

The first feeding pad 11 is formed on the upper surface of the circuit board 10 through the SMD process. The first feeding pad 11 is connected to the first signal processing element (not illustrated) for processing the signal in the first frequency band.

The first feeding pad 11 is formed in an area of the upper surface of the circuit board 10, which is in surface contact with the first feeding area 211 of the shield can 1 mounted on the upper surface of the circuit board 10. As the shield can 1 is mounted on the circuit board 10, the first feeding pad 11 is in surface contact with the first feeding area 211 of the shield can 1 and electrically connected to the first feeding area 211. In this case, the first radiation area 210 of the shield can 1 is in surface contact with the first feeding pad 11 to receive power and resonates in the first frequency band to transmit the signal in the first frequency band to the first signal processing element (not illustrated).

The second feeding pad 12 is formed on the upper surface of the circuit board 10 through the SMD process. The second feeding pad 12 is connected to a second signal processing element (not illustrated) for processing the signal in the second frequency band.

The second feeding pad 12 is formed in an area of the upper surface of the circuit board 10, which is in surface contact with the second feeding area 221 of the shield can 1 mounted on the upper surface of the circuit board 10. As the shield can 1 is mounted on the circuit board 10, the second feeding pad 12 is in surface contact with the second feeding area 221 of the shield can 1 and electrically connected to the second feeding area 221. In this case, the second radiation areas 220A, 220B, and 220C of the shield can 1 are in surface contact with the second feeding pad 12 to receive power and resonate in the second frequency band to transmit the signal in the second frequency band to the second signal processing element (not illustrated).

Meanwhile, in FIGS. 4 and 5, although it has been illustrated and described that the shield can is in surface contact with and boned to the circuit board 10 of the electronic device in order to easily describe the embodiment of the present disclosure, the present disclosure is not limited thereto, and the shield can 1 may be coupled by being fitted into a coupling member such as a C-clip or a connector formed on the circuit board. In addition, the shield can 1 may be mounted on the circuit board 10 in a conventional coupling manner to be mounted on the circuit board 10.

Meanwhile, although FIGS. 4 and 5 illustrate an example in which the shield can 1 is coupled to the circuit board 10 with the size corresponding to the shield can 1, the present disclosure is not limited thereto, and the shield can 1 may be mounted on the circuit board 10 with various sizes. In addition, the shield can 1 and the circuit board 10 may be mounted on another substrate in a state of being coupled and modularized.

The best embodiments of the present disclosure have been disclosed in the drawings and the specification. Here, although specific terms are used, they are used only for the purpose of describing the present disclosure and are not used to limit the meaning or scope of the present disclosure described in the claims. Therefore, those skilled in the art will understand that various modifications and equivalent embodiments are possible from the present disclosure. Therefore, the true technical scope of the present disclosure should be determined by the technical spirit of the appended claims.

The invention claimed is:

1. A shield can disposed on a printed circuit board to cover electronic components mounted on the printed circuit board, comprising:

a plurality of slits formed in the shield can to partition the shield can into a plurality of internal areas and an external area spaced apart from the plurality of internal areas;

a shielding area which is the external area partitioned by the plurality of slits; and radiation areas which are the plurality of internal areas partitioned by the plurality of slits, wherein each of the plurality of slits is formed by opening a portion of an upper surface and a portion of at least one of side surfaces of the shield can, wherein each of the plurality of slits is in the form of surrounding each of the radiation areas in all directions and in the form of an open portion except for a connection portion of the radiation area and the shielding area.

2. The shield can of claim 1, wherein the radiation areas are spaced apart in a perimetric direction of the shield can.

3. The shield can of claim 1, wherein each of the radiation areas is disposed adjacent to a respective corner of the shield can.

4. The shield can of claim 1, wherein the radiation areas have one of a meander line shape or a patch shape.

5. The shield can of claim 1, wherein a first radiation area, which is any one of the radiation areas, is formed in a meander line shape to resonate in a first frequency band, and a plurality of second radiation areas except for the first radiation area among the radiation areas is formed in a patch shape to resonate in a second frequency band which differs from the first frequency band.

6. The shield can of claim 5, wherein the plurality of slits include:

a first slit disposed between the first radiation area and the shielding area; and a second slit disposed between the plurality of second radiation areas and the shielding area, and widths of the first slit and the second slit are 1 mm or more.

7. The shield can of claim 5, wherein two adjacent second radiation areas of the plurality of second radiation areas are provided symmetrically on the upper surface of the shield can.

8. The shield can of claim 5, wherein the first radiation area resonates in the first frequency band to operate as a Bluetooth® low energy (BLE) antenna, and the plurality of second radiation areas resonate in the second frequency band to operate as an ultra-wideband (UWB) antenna.

9. The shield can of claim 1, further comprising: a feeding area formed on a lower surface of the shield can and connected to each of the radiation areas; and a bonding area formed along a bottom edge of the shield can, spaced apart from the feeding area, and bonded to the printed circuit board.

* * * * *